E. P. GILLESPIE.
NUT LOCK.
APPLICATION FILED MAR. 6, 1908. RENEWED JUNE 24, 1910.
983,704. Patented Feb. 7, 1911.
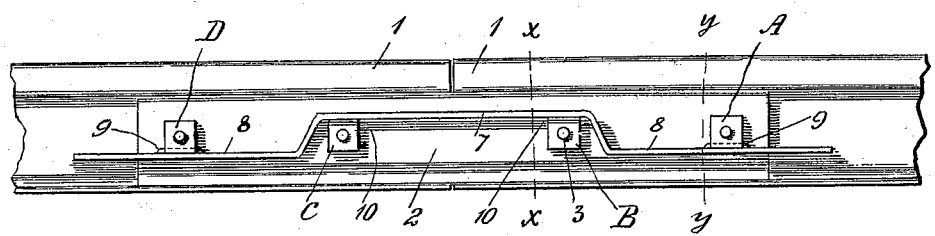
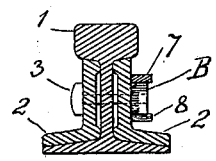
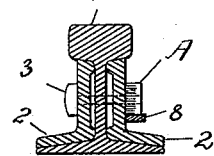
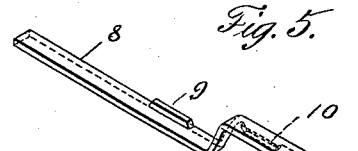
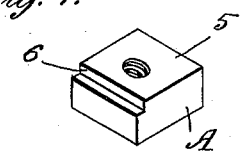
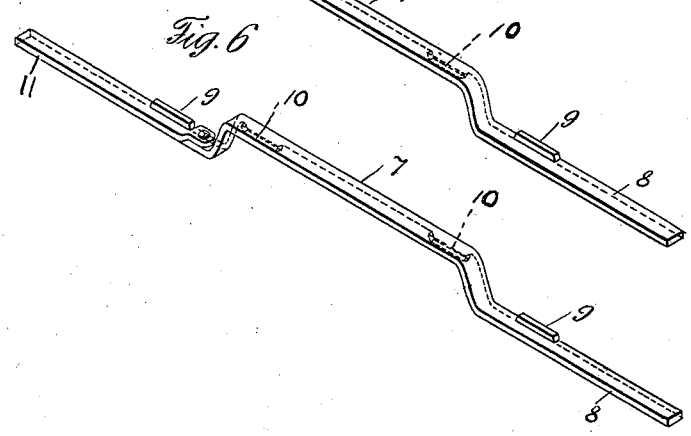
Inventor
E. P. Gillespie
Witnesses
By H. C. Everitt
Attorneys

UNITED STATES PATENT OFFICE.

EDWARD P. GILLESPIE, OF EMSWORTH, PENNSYLVANIA.

NUT-LOCK.

983,704. Specification of Letters Patent. Patented Feb. 7, 1911.

Application filed March 6, 1908, Serial No. 419,585. Renewed June 24, 1910. Serial No. 568,718.

*To all whom it may concern:*

Be it known that I, EDWARD P. GILLESPIE, a citizen of the United States of America, residing at Emsworth, in the county of Allegheny and State of Pennsylvania, have invented certain new and useful Improvements in Nut-Locks, of which the following is a specification, reference being had therein to the accompanying drawing.

This invention relates to nut locks, and the objects of my invention are, first, to provide novel and efficient means for holding three or more nuts in a fixed position upon bolts; second, to provide a nut lock that can be easily and quickly placed in position; third, to provide a nut lock that can be advantageously used in connection with a rail joint, wherein a plurality of bolts and nuts are employed for connecting splice bars to the confronting ends of two rails. I attain the above objects by a nut lock that will be presently described in detail and then specifically pointed out in the appended claim.

In the drawings:—Figure 1 is an elevation of my nut lock as applied to a rail joint, Fig. 2 is a cross sectional view taken on the line x—x of Fig. 1, Fig. 3 is a similar view taken on the line y—y of Fig. 1, Fig. 4 is a perspective view of a nut constructed in accordance with my invention, Fig. 5 is a perspective view of a nut locking bar having a rigid handle, Fig. 6 is a similar view of a bar having a pivoted handle.

In the accompanying drawings, I have illustrated rails 1 as connected by splice bars or plates 2, bolts 3 and nuts A, B, C and D. I cut away the inner face 5 of each nut to provide a shoulder 6 parallel and in close proximity to one edge of the nut, whereby when said nuts are screwed upon the bolts 3, the cut away edges thereof will form grooves in conjunction with the splice bar 2 engaged by said nuts. The nuts are then rotated upon the bolts 3, whereby some of the grooves will be at the lower edges of some of said nuts and other grooves at the upper edges of some of said nuts. This positioning of the nuts is clearly illustrated in Fig. 1 of the drawings.

In connection with the nuts I use either a rigid or resilient locking bar, said bar comprising a central yoke portion 7 having laterally extending handles 8 in a plane parallel to the top of the yoke 7. The handles 8 adjacent to the yoke 7 are provided with upwardly extending tongues 9, these tongues being located at one edge of the bar. The yoke 7 is provided with depending tongues 10, these tongues being located upon the same edge of the bar as the tongues 9. This form of locking bar is illustrated in Fig. 5 of the drawings, and to place the same in position, the tongue 9 at one end of the bar is placed in engagement with the shoulder 6 of the nut A. The tongues 10 are then placed in engagement with the shoulders 6 of the nuts B and C. The opposite end of the locking bar is then pressed downwardly and sprung under the nut D. The tongues 9 and 10 engaging said nuts prevent one nut from rotating with relation to the other of said nuts, and the resiliency of the bar is adapted to hold said bar firmly in engagement with said nuts, while the tongues 9 and 10 prevent lateral or sidewise movement of said bar.

In Fig. 6 of the drawings, I have illustrated a nut locking bar as having a pivoted handle 11. This construction permits of the yoke 7 and the opposite end of the bar being rigid, while the handle 11 is of a resilient material that permits the tongue 9 thereof being easily sprung into position upon the nut D.

The tongues 9 and 10, on the locking-bar are of a length substantially equal to the length of the width of the nut faces so that in event of any longitudinal shifting of the locking-bar, a portion of each tongue will still remain in the groove of the nut it engages.

By rotating the nuts a half revolution, my locking bar can be used just the reverse of that shown in Fig. 1 of the drawings.

Having now described my invention what I claim as new, is:—

The combination with a plurality of nuts each provided on the inner face along one edge with a cut away portion extending throughout the length of said face, of a bar of spring metal bent to lie underneath some of said nuts and on top of the remaining nuts, and tongues on the reverse sides of the bar, one for each nut, said tongues engaging in the cut away portions of the nuts and being of a length substantially equal to the width of the nut faces.

In testimony whereof I affix my signature in the presence of two witnesses.

EDWARD P. GILLESPIE.

Witnesses:
 MAX H. SROLOVITZ,
 K. H. BUTLER.